United States Patent [19]
Gamble et al.

[11] Patent Number: 5,319,960
[45] Date of Patent: Jun. 14, 1994

[54] SCANNING FORCE MICROSCOPE

[75] Inventors: Ronald C. Gamble, Altadena; Paul E. West, Cupertino, both of Calif.

[73] Assignee: Topometrix, Santa Clara, Calif.

[21] Appl. No.: 847,160

[22] Filed: Mar. 6, 1992

[51] Int. Cl.⁵ ............................................. G01B 5/28
[52] U.S. Cl. ....................................................... 73/105
[58] Field of Search ........................... 73/105; 250/306

[56] References Cited

U.S. PATENT DOCUMENTS

| | | |
|---|---|---|
| 4,343,993 | 8/1982 | Binnig et al. |
| 4,914,293 | 4/1990 | Hayashi et al. ............... 250/306 |
| 4,935,634 | 6/1990 | Hansma et al. |
| 4,987,303 | 1/1991 | Takase et al. ................. 73/105 |
| 5,025,658 | 6/1991 | Elings et al. |
| 5,103,095 | 4/1992 | Elings et al. ................. 250/306 |
| 5,189,906 | 3/1993 | Elings et al. ................. 73/105 |
| 5,193,385 | 3/1993 | Nishioka et al. .............. 73/105 |

OTHER PUBLICATIONS

Burnham et al., "Measuring the nanomechanical properties and surface forces of materials using an atomic force microscope", J. Vac. Sci. Tech., Jul./Aug. 1989.
Digital Instruments, Jun. 15, 1991, all pages.
Digital Instruments, NanoScope AFM, Jun. 15, 1991, all pages.
NanoScope Large-Sample SPM, undated, all pages.
SFM-BD2 Scanning Force Microscope ..., Park Scientific Instruments, all pages, Spring 1992.
NanoScope II, Digital Instruments, Undated, all pages.
PSI Probe, Park Scientific Instruments, Fall 1991, all pages.

*Primary Examiner*—Robert Raevis
*Attorney, Agent, or Firm*—Fulwider Patton Lee & Utecht

[57] ABSTRACT

The scanning force microscope is an improved free standing type scanning force microscope with integrated scanning drivers for examination of a wide range of sizes and weights of stationary specimens, with the capability of scanning a sample in contact with a fluid. The scanning force microscope also includes motorized driver legs for operating the approach of the optical lever arm and sensor head to the sample, to allow for automation of the approach of the sensor head to the specimen.

11 Claims, 5 Drawing Sheets

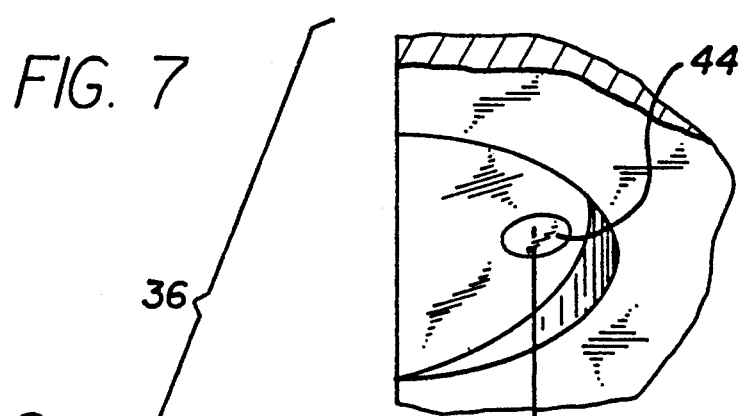
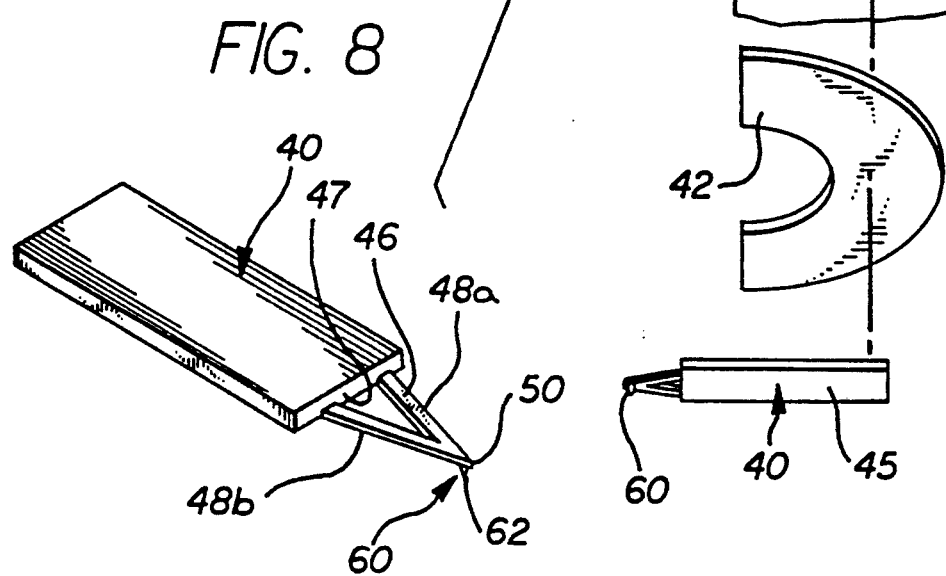
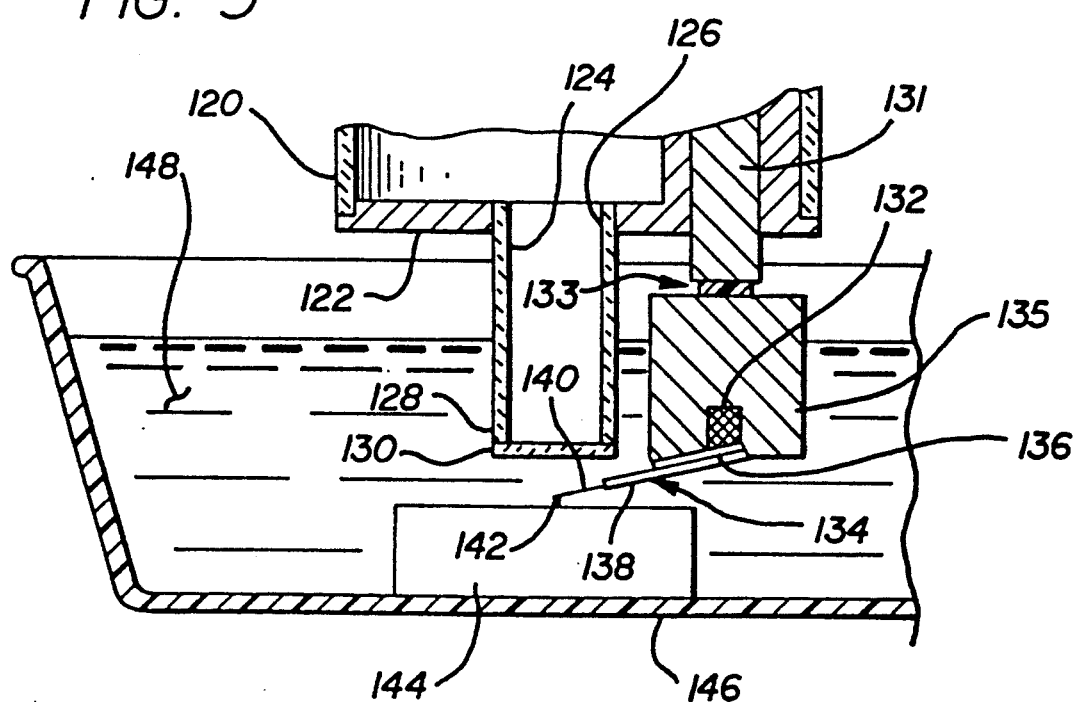

SCANNING FORCE MICROSCOPE

BACKGROUND OF THE INVENTION

1. Field of the Invention:

This invention relates generally to scanning force microscopes, and more particularly concerns a sensor module for a scanning force microscope with integrated scanning drivers for use with a stationary specimen.

2. Description of Related Art:

Scanning force microscopes, also known as atomic force microscopes, are useful for imaging objects as small as atoms. The scanning force microscope is closely related to the scanning tunneling microscope and the technique of stylus profilometry, however in a typical scanning force microscope, deflection of a laser beam by a vertical movement of a probe following the contours of a specimen is amplified by a reflective lever arm to which the probe is mounted. The deflection of the laser beam is typically monitored by a photodetector in the optical path of the deflected laser beam, and the sample is mounted on a stage moveable in minute distances in three dimensions so that the sample can be raster scanned while the vertical positioning of the probe relative to the surface of the sample is maintained substantially constant by a feedback loop with the photodetector controlling the vertical positioning of the sample.

Such scanning force microscopes are useful for imaging a sample which is moved in three dimensions while the sensor head is stationary and separate from the scanning assembly moving the sample. However, this conventional design is only useful for samples which are comparatively small or which can be cut small enough from a larger specimen to be examined on the scanning stage of the microscope. Such samples typically must also weigh about a gram or less, in order to accommodate the relatively high scan rates without causing distortion due to resonance effects. Although one design for a free standing scanning force microscope includes a scanning mechanism and sensor element for scanning large samples, the design is difficult to operate and employs a sensor head force on a sample which prohibits use of the microscope for scanning many polymers and biological molecules. It would therefore be desirable to provide an improved free standing scanning force microscope which can be used to examine the surface of minute samples and stationary samples of larger sizes, and weights greater than a gram, in principle without limitation.

It would also be desirable to provide a scanning force microscope with the capability of scanning a sample in contact with a fluid, without the preparation of special fluid cells or special adapters. This capability would be particularly useful in some applications, as such a fluid environment can significantly change scanning conditions and opportunities, and can improve the quality of the image of the sample developed by the instrument.

In conventional scanning force microscopes, a probe can also be damaged by too abrupt an approach to a sample before feedback position control of the sensor head is actually engaged. The user typically can not easily view the approach of the lever arm and probe assembly to the surface of the sample to insure precise positioning of the probe. Even where an optical microscope is used in conjunction with the scanning force microscope to view the sample, the arrangement of the optical microscope with the scanning force microscope can be inconvenient and clumsy, and can interfere with the operation of the scanning force microscope. It would further be desirable to provide the base of the microscope with motorized driver means for operating the approach of the optical lever arm and sensor head to the sample, which can be controlled by feedback control means, to allow the process of approach of the sensor head to the sample to be automated. The present invention meets these needs.

SUMMARY OF THE INVENTION

Briefly, and in general terms, the present invention provides for an improved free standing type scanning force microscope with integrated scanning drivers for examination of an extremely wide range of sizes and weights of stationary specimens, with the capability of scanning a sample in contact with a fluid, and with motorized driver means for operating the approach of the optical lever arm and sensor head to the sample, to allow for automation of the approach of the sensor head to the specimen.

The invention accordingly provides for a scanning force microscope for examining surface contours of a stationary specimen. The microscope preferably includes a body having a base adapted to be positioned on a substrate for examination of the specimen, and scanning means with scanning drivers integrated into the microscope to scan the sensor probe of the microscope in three dimensions or degrees of freedom relative to the stationary specimen. The sensor probe is preferably mounted to a reflective optical lever arm means magnetically secured to the microscope body. The sensor probe preferably is controlled by the integrated drivers in the microscope to contact and follow the surface contours of the specimen with a substantially constant amount of force.

A laser light source means is also provided in the body of the microscope for producing a focused laser beam directed at and deflected by the optical lever arm means, and photodetector means is provided in the body of the microscope to receive the deflected laser beam and to produce an output signal indicative of the degree of deflection of the laser beam by the optical lever arm means. Means for viewing the optical lever arm, probe means, and an adjacent specimen may also be provided.

The optical lever arm means preferably includes a reflective cantilever arm having a free end to which the probe tip is mounted, and the optical lever arm means is preferably magnetically secured to the body. The photodetector means preferably includes a photodetector mounted to the body, and mirror means mounted within the body to deflect the laser beam from the optical lever arm means to the photodetector. Control means are also preferably provided for maintaining a constant force of the probe means against the surface contours of the specimen. In a preferred alternate embodiment the microscope includes a sealed window which may be placed in a liquid containing the specimen for examining the specimen in a liquid environment.

These and other aspects and advantages of the invention will become apparent from the following detailed description, and the accompanying drawing, which illustrates by way of example the features of the invention.

BRIEF DESCRIPTION OF THE DRAWINGS

FIG. 7 is an enlarged, exploded view showing the mounting of the optical lever arm assembly of the scanning force microscope of the invention;

FIG. 8 is an enlarged perspective view of the integral support member, cantilever arm, and probe tip of the optical lever arm assembly of the invention; and FIG. 9 is an enlarged, partial sectional view of an alternate embodiment of the scanning force microscope of the invention, including a sealed viewing tube in the piezo tube of the scanning force microscope for viewing specimens in a liquid environment.

DETAILED DESCRIPTION OF THE PREFERRED EMBODIMENTS

Figure 1:
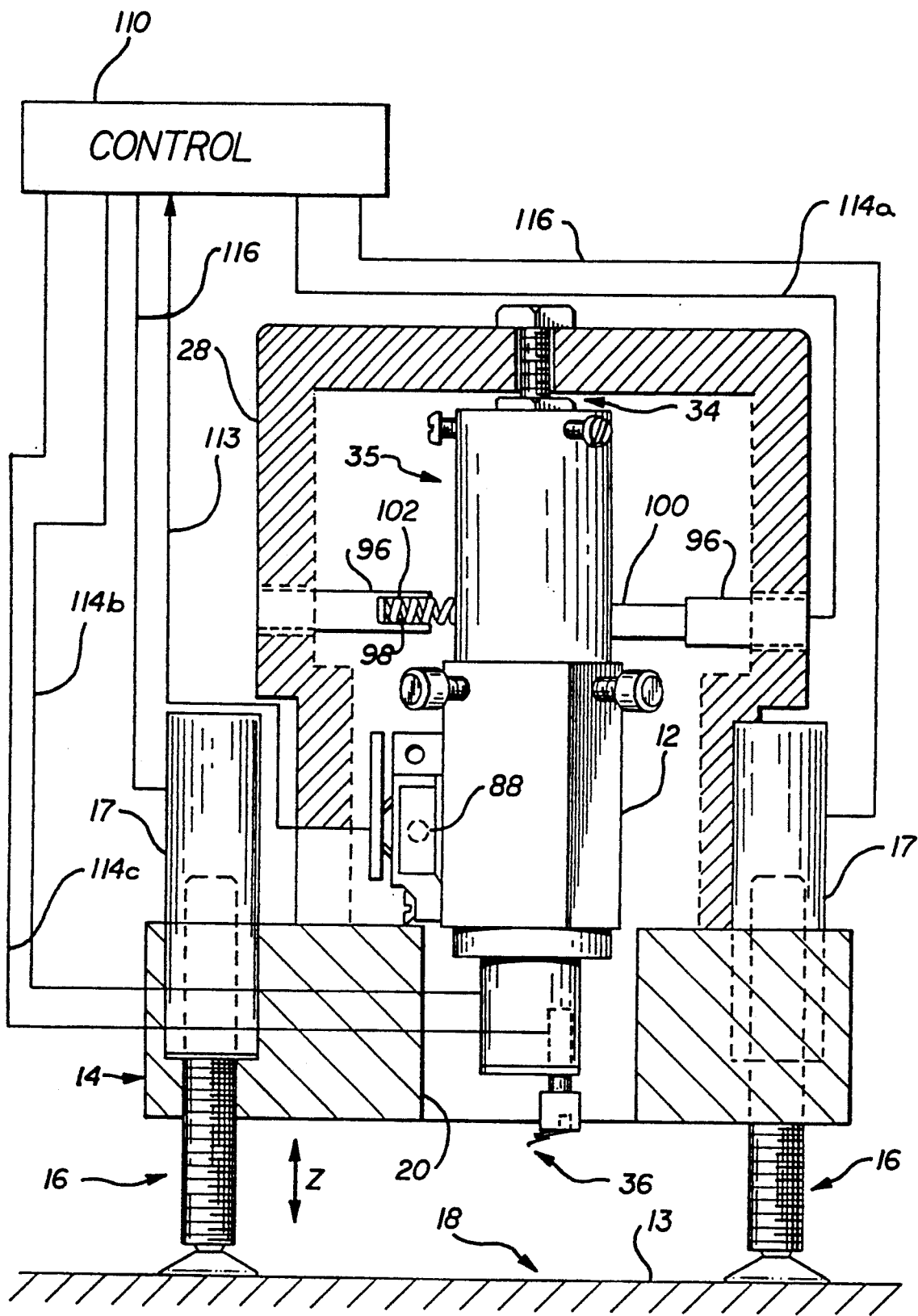
FIG. 1 is a diagrammatic side view of the scanning force microscope of the invention placed on a substrate for examination.
Figure 2:
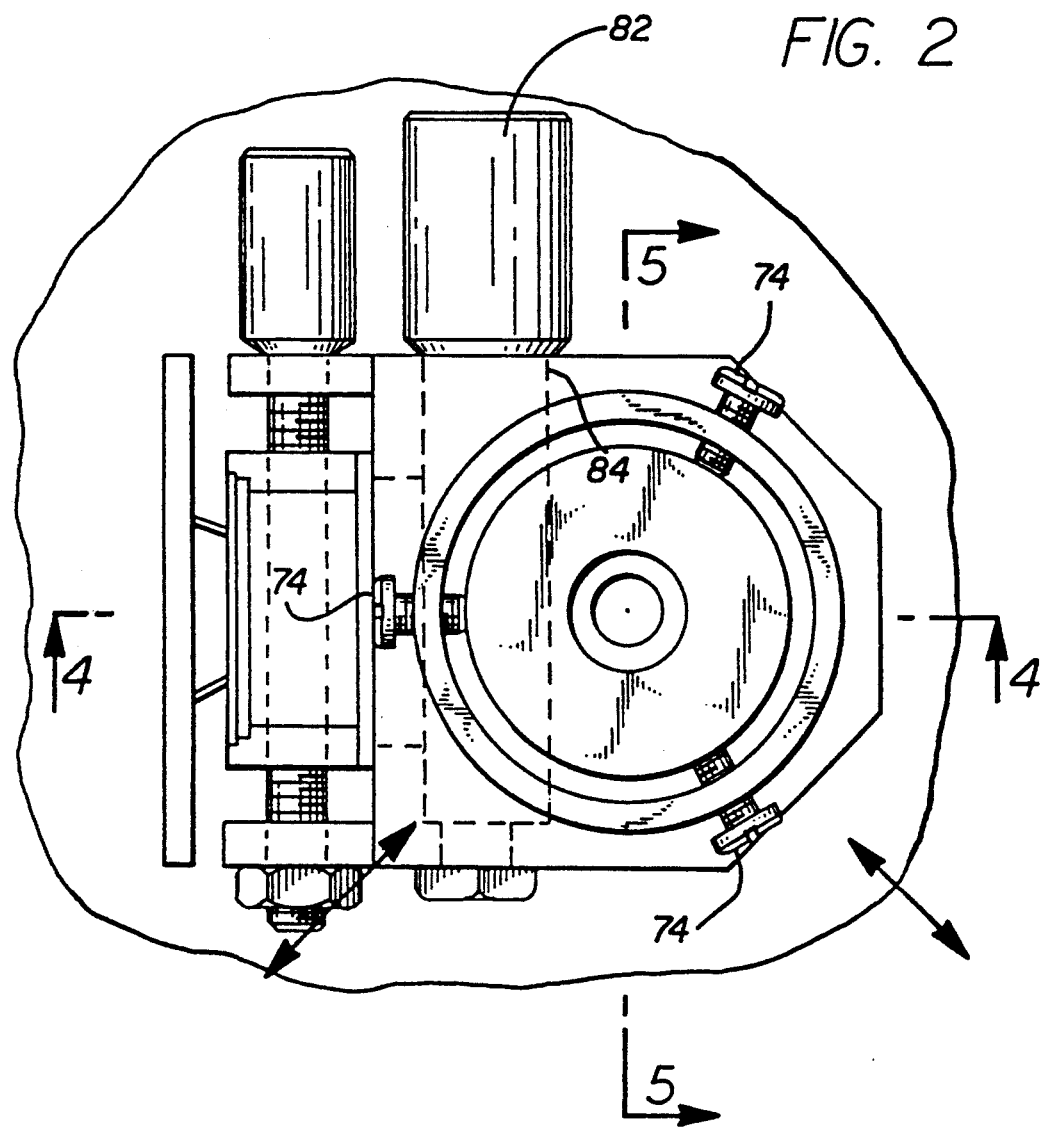
FIG. 2 is cut away top plan view of the scanning force microscope of the invention.
Figure 3:
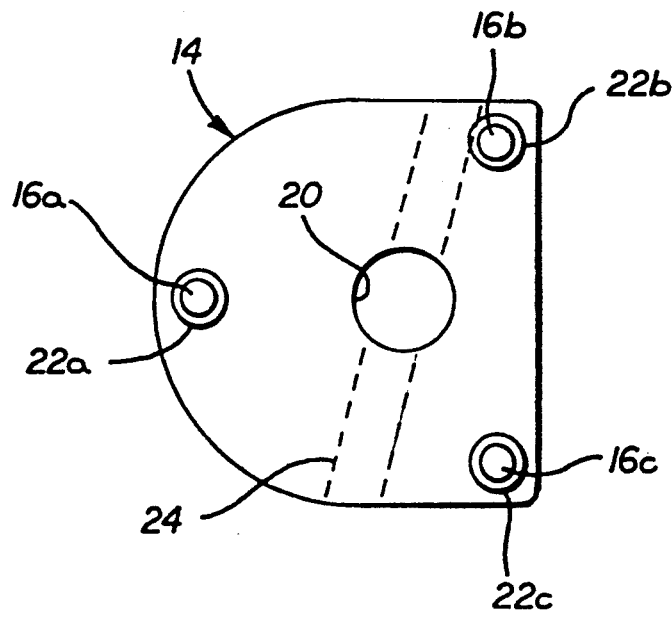
FIG. 3 is a bottom plan view of the base of the scanning force microscope of the invention.
Figure 4:
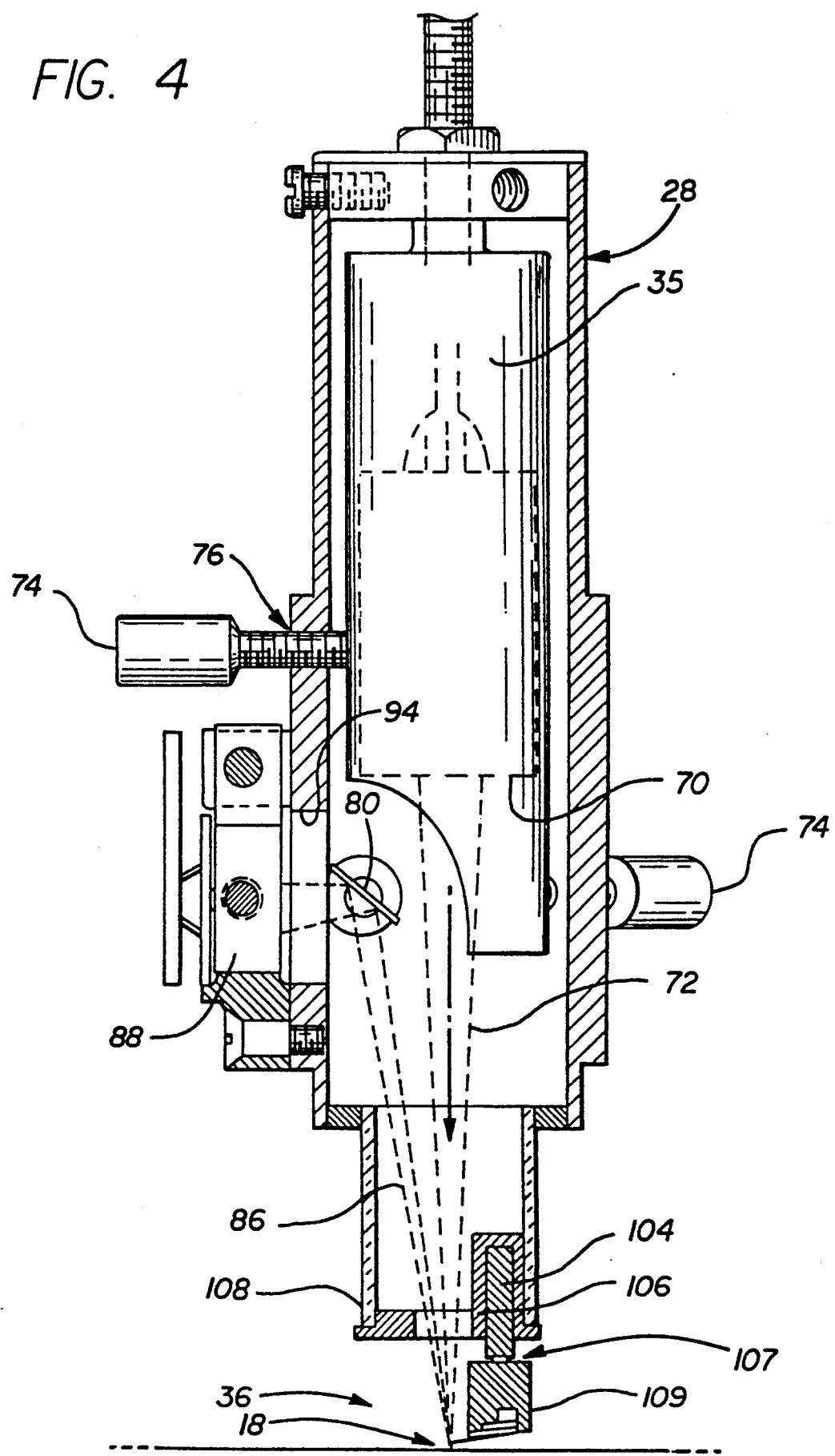
FIG. 4 is a cross-sectional elevational view of the scanning force microscope of the invention, taken along line 4—4 of FIG. 2.
Figure 5:
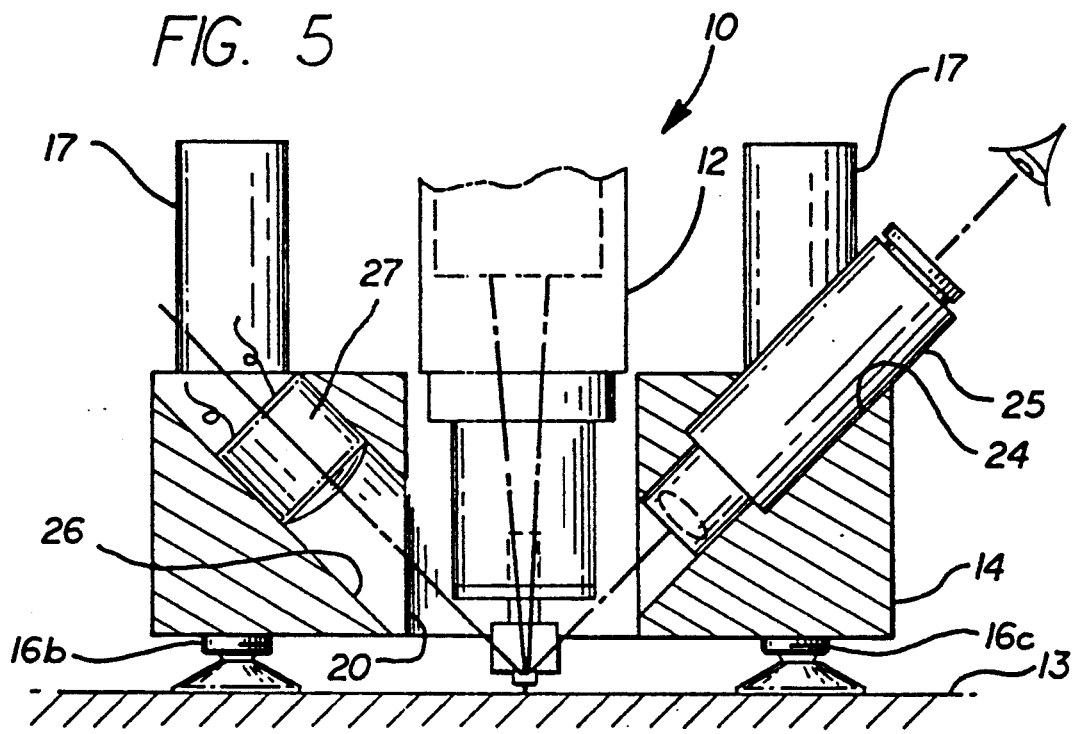
FIG. 5 is a partial, enlarged cross-sectional elevational view of the scanning force microscope of the invention, taken along line 5—5 of FIG. 2.
Figure 6:
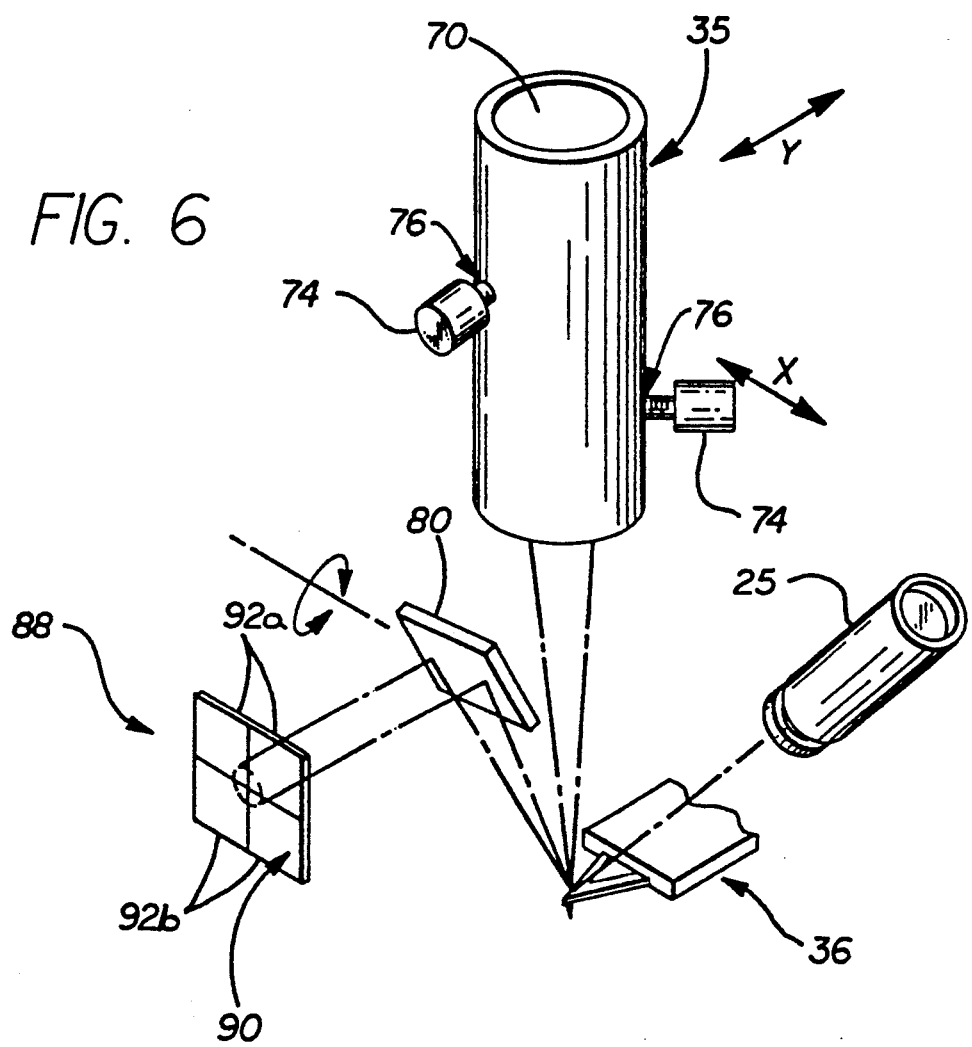
FIG. 6 is an exploded diagrammatic perspective view illustrating the spatial relationships of major elements of the scanning force microscope of the invention.

Scanning force microscopes are typically limited for use with comparatively small samples of a gram or less, to accommodate scan rates of such microscopes without causing distortion due to resonance effects. Free standing type scanning force microscopes are frequently difficult to operate and employ a sensor head force on a sample which prohibits examination of many polymers and biological molecules. Such microscopes typically also do not include the capability of scanning a sample in a liquid environment, limiting the quality and opportunities for viewing of specimens. Scanning force microscopes also commonly do not allow for feedback control of the approach of the lever arm and probe assembly to the surface of the sample to insure precise positioning of the probe, allowing a probe to be damaged by too abrupt an approach.

As is illustrated in the drawings, the invention is embodied in an improved free standing type scanning force microscope 10 having a stationary body 12 including a lower base 14 secured to the body by screws or bolts, with adjustable motor driven legs 16a,b,c for supporting the body of the microscope on a substrate 13 and moving the body of the microscope in a vertical dimension relative to a specimen 18 mounted with respect to the substrate. Each of the motor driven legs includes an optically encoded screw drive motor 17 connected to a control unit, as is described later, which coordinates the operation of the legs in response to position signals from the optically encoded screw drive motors, so that the motors operate in unison to raise and lower the microscope uniformly. The specimen to be examined can in fact consist of a portion of the substrate, and can therefore in principle be of any size or weight, such as the wing of an aircraft, or a desk top, for example.

The base of the microscope typically has the general shape of a rectangular block, and preferably includes a middle bore 20 for extension of the sensor head to the specimen to be examined, and for the light path of laser beam to optical lever arm of the sensor head, as will be explained further. The motorized adjustable support legs 16a,b,c of the base are preferably are three in number, arranged in a tripod, although other numbers of support legs such as four, for example, arranged at the corners of the rectangular base may also be possible. The length of extension of the support legs from the bottom of the base is preferably adjustable by screw drive motors 22a,b,c to which the support legs are mounted, and the screw drive motors are typically mounted to the upper side of the base with the support legs extending through bores in the base. The rectangular block of the base may also include a bore 24 for an objective lens 25 or charge couple device (not shown) extending through the block and focusing on the area where the optical lever arm, sensor head and surface of the specimen will come together. A second bore 26 may also be provided through the base, also directed to the area of the optical lever arm and specimen, to allow illumination to be directed from a lamp 27, for example, to this area for optically viewing the approach of the sensor head to the specimen. A scanner assembly shell 28 is preferably mounted to the upper side of the base. The upper end of the scanner shell assembly provides a site for mounting the pivot 34 for the body of the generally cylindrical inner sensor assembly or kernel 35, which includes the laser light source and sensor head assembly 36.

The sensor head assembly 36 preferably includes an optical lever arm 40 secured to the body of the inner sensor assembly as will be further explained below, and preferably includes a half washer member 42 of magnetic steel, magnetically secured to a magnet 44 secured to the body of the inner sensor assembly. An integral cantilever support member 45 is mounted to a central portion of the half washer member, extending to the open middle portion of the half washer member. A reflective cantilever arm 46 formed in the shape of a triangle from first and second arms 48a, 48b is secured at one end to the free end 47 of the integral cantilever support member and joined together at their free ends 50. The arms of the cantilever arm are typically about 18 microns wide, about 200 microns long, about 0.6 microns thick, and are secured to the integral cantilever support member about 120 microns apart. Although the silicon nitride material (available from Park Scientific Instruments) from which the cantilever arm is made is normally considered quite rigid, with these dimensions the cantilever arm bows and flexes as much as 20° in response to the force of the probe tip against the specimen, amplifying the deflection of the laser beam, as will be explained further below. The integral cantilever, support member and the reflective cantilever arm are so small that they are most conveniently etched from silicon nitride, although other materials such as silicon which can lend themselves to etching, fine machining, or other such processes familiar to those skilled in the art of manufacturing integrated circuit chips, and which can provide a reflective surface may be suitable as well. Attached to the free end 50 of the cantilever arm is a probe means 60 including a distal needle-like probe tip 62 adapted to contact and follow the surface contours of the specimen.

A laser light source means 70 such as a laser diode with associated optics, is mounted in the upper portion of the body for producing a focused laser beam 72 directed at and deflected by the reflective cantilever arm. One preferred laser diode which is commercially available is a 3 milliwatt laser diode which produces a beam in the 670 nm range. Opening 20 is provided in the removable base 14 to allow the laser beam to pass through to the cantilever arm. Preferably three or more adjustment screws 74 for adjusting the alignment and aiming of the laser light source are mounted in threaded access ports 76 provided in body. A reflective means such as the planar mirror 80 is preferably mounted in the interior of the body at a distal end of an adjustment screw 82 through threaded access port 84 to reflect the deflected beam 86 to a photodetector 88 mounted to body for receiving the deflected laser beam.

The photodetector preferably generates an electrical output signal in response to the deflected laser beam indicative of the degree of deflection of the laser beam by the cantilever arm. The photodetector is mounted to receive the deflected laser beam through photodetector port 94 in the body, and is typically formed as an array of four photosensors 90, in which the top pair 92a is coupled to provide a combined signal, and the bottom pair 92b is coupled to provide a combined signal. The deflected laser beam is typically targeted at a central point between the top and bottom portions of the photodetector, and the combined signals from these portions are processed to generate output signals which can be compared to produce a differential error signal by control means 110.

The mechanism for raster scanning the sensor head preferably includes a pair of stacked piezo drivers 100 disposed in the scanner shell assembly oriented horizontally at right angles to each other for low resolution or large scale x and y raster scanning movements ranging approximately from zero to 200 microns, and corresponding opposing coil compression springs 102. The large motion horizontal piezo drivers 100 and the opposing coil springs are mounted between the inner scanner assembly and the scanner shell in push rods 96 having push rod chambers 98 for containing and securing one end of the piezo drivers and springs. Large scale motion of the sensor head assembly in the vertical or Z dimension approximately from zero to 20 microns is controlled by a stacked piezo driver 104 mounted vertically in a holder 106 preferably formed of an insulating ceramic such as that sold under the trade name MACOR, available from Corning, mounted, for example by an adhesive such as epoxy, in a portion of a piezo tube driver 108, of the type which is well known in the art. The upper end of the piezo driver 104 is preferably adhesively secured to the holder such as by epoxy, and the lower end of the piezo driver 104 is preferably adhesively secured, such as by epoxy 107 to a sensor head mounting block 109, preferably formed of an insulating ceramic such as MACOR, to which the magnet of the sensor head assembly is secured. The range of motion of the stacked piezo drivers is of course dependent upon the piezo material selected and the length of the piezo stack. The piezo tube driver 108 is mounted to the lower end of the body of the inner sensor assembly, to provide for small scale x, y, and z motion of sensor head assembly. The small scale motion achievable with the piezo tube driver ranges approximately from zero to 5 microns in the vertical or z direction, and approximately from zero to 10 microns in the horizontal or x and y dimensions, depending upon the size of the cantilever arms of the sensor head assembly, typically with an atomic resolution as small as approximately 0.02 nm in the vertical dimension, and approximately 0.03 in the horizontal dimension.

The scanning means preferably also includes feedback control means 110 for driving the piezo tube in the vertical dimension as the probe tip traverses the contours of the specimen, to maintain a substantially constant force of the probe means against the surface of the specimen. The control means preferably comprises microprocessor means (not shown) electrically connected to the photodetector means by line 113 to receive the output signals indicative of deflection of the laser beam from the optical lever arm means, and for generating the error signal indicative of a variance from the constant amount of force of the probe tip against the specimen surface. The control means is electrically connected to the piezoelectric drivers by control lines 114a–c for raising and lowering the sensor head assembly with respect to the specimen for increasing or decreasing the force of the probe tip against the specimen surface to maintain the substantially constant amount of force of the probe tip against the specimen surface, and for raster scanning the sensor head assembly in a horizontal plane in X and Y directions. The optically encoded screw drive motors 17 of the motor driven legs are also connected to the control means 110 by control lines 116 enabling the control means to receive the optically encoded position signals from the drive motors and to uniformly coordinate the operation of the drive motors in raising and lowering the microscope.

In one alternate preferred embodiment, the tubular piezo ceramic tube driver 120 is fitted with an end piece or cap 122 having a middle viewing tube 124 secured to the cap at an upper end 126 of the viewing tube and extending downwardly therefrom. The viewing tube is sealed at its lower end 128 by a window 130 such as a thin pane of glass, to allow the piezo tube to be placed in a liquid. A stacked piezo driver 131 is secured to the piezo tube for large vertical movements of the sensor head assembly, and adhesively secured at 133 to the lower end of the piezo driver, by an adhesive such as epoxy, is a sensor head mounting block 135, preferably formed of an insulating ceramic such as MACOR. The mounting block contains magnet holder 132, to which the optical lever arm 134 is preferably magnetically secured, as in the previous embodiment. Thus, a half washer member 136 made of magnetic steel is magnetically secured to the magnet, and an integral cantilever support member 138 extends from the middle of the half washer member to support the cantilever arm 140. The probe tip 142 extends from the underside of the cantilever arm, to be placed in contact with a specimen 144, preferably mounted on substrate 146 in a liquid environment 148 such as water, propanol, ethanol, or the like. The remainder of the structure of the scanning force microscope in this alternate embodiment is substantially identical to that of the previous embodiment. The sensor head assembly can thus be submerged in the liquid environment for scanning of the stationary specimen.

It has therefore been demonstrated that the scanning force microscope of the invention provides for an improved mount for the probe of the microscope, which is easier to handle and install in the microscope. The integrated optics of the microscope permits the user to view the approach of the lever arm and probe assembly to the surface of the sample to insure safe and precise positioning of the probe near the specimen. The scanning force microscope also includes the capability of scanning a specimen in a fluid environment, which can significantly improve the quality of the image of the specimen produced by the instrument.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A scanning force microscope for examining surface contours of a specimen, comprising:
    a) a housing having a base adapted to be positioned on a substrate with respect to said specimen, said housing including a magnetic sensor mounting portion and a sealed viewing tube having a transparent viewing window for viewing a stationary specimen in a liquid;
    b) sensor means for measuring surface contours of said specimen, said sensor means being mounted to said housing for movement relative thereto, said sensor means including an optical lever arm having a reflective surface and a probe tip, said optical lever arm being removably magnetically secured to said magnetic sensor mounting portion, said probe tip extending from said optical lever arm to contact and follow the surface contours of the specimen with a substantially constant amount of force;
    c) laser light source means mounted to said housing for producing a focused laser beam directed at and deflected by said optical lever arm means through said viewing tube;
    d) photodetector means for receiving said laser beam deflected by said optical lever arm through said viewing tube and generating an output indicative of a degree of deflection of said laser beam by said optical lever arm, said photodetector means being mounted in said housing;
    e) scanning means mounted to said housing for moving said sensor means with respect to said specimen in three degrees of freedom relative to said housing; and
    f) control means for maintaining a constant force of said probe tip against said surface contours of said specimen.

2. The scanning force microscope of claim 1, wherein said optical lever arm comprises a cantilever arm having a free end.

3. The scanning force microscope of claim 2, wherein said probe tip is mounted to said free end of said cantilever arm.

4. The scanning force microscope of claim 2, wherein said optical lever arm includes a magnetic steel member removably magnetically secured to said magnetic portion, and said cantilever arm is mounted to said magnetic steel member.

5. The scanning force microscope of claim 1, wherein said optical lever arm includes a free end, and said probe tip is mounted to said free end of said optical lever arm.

6. The scanning force microscope of claim 1, wherein said photodetector means includes a photodetector mounted to said housing, and further including reflecting means mounted within said housing to deflect said laser beam from said optical lever arm to said photodetector.

7. The scanning force microscope of claim 1, wherein said scanning means includes a plurality of piezoelectric drive members disposed adjacent said housing and operatively connected to said control means to move said optical lever arm means and said probe tip secured thereto in three degrees of freedom relative to said surface contours of said specimen.

8. The scanning force microscope of claim 1, wherein said housing includes means for adjusting distance of said base portion from said substrate.

9. The scanning force microscope of claim 8, wherein said means for adjusting distance comprises a plurality of adjustable foot members mounted to said base and adapted to contact said substrate, and foot member drive means connected to said foot members and said housing for individually extending and retracting said plurality of foot members with respect to said base, said foot member drive means being operatively connected to said control means.

10. The scanning force microscope of claim 9, wherein said adjustable foot member drive means comprises a plurality of corresponding optically encoded screw drive motors associated with said foot members and mounted to said base for driving said foot members to raise and lower said microscope, said drive motors being adapted to generate a position signal indicative of a position of the associated foot members, said control means being connected to said plurality of drive motors to receive said position signal and to control the operation of said drive motors for uniformly raising and lowering said microscope with respect to said substrate.

11. The scanning force microscope of claim 1, wherein said control means comprises means connected to said photodetector means for receiving said output signal indicative of deflection of said laser beam from said optical lever arm means, means for generating an error signal indicative of a variance from said constant amount of force of said probe tip against said specimen surface, and electrical drive means responsive to said error signal for raising and lowering said specimen with respect to said probe tip for increasing or decreasing the force of said probe tip against said specimen surface to maintain said substantially constant amount of force of said probe tip against said specimen surface.

* * * * *